Aug. 26, 1952     L. C. SECORD ET AL     2,608,056
POWER TAKE-OFF FROM THE FORWARD END
OF AIRCRAFT PROPULSIVE POWER UNITS

Filed Nov. 7, 1950     2 SHEETS—SHEET 1

INVENTORS
W. BOYD
L. C. SECORD
PER

ATTORNEY.

Aug. 26, 1952    L. C. SECORD ET AL    2,608,056
POWER TAKE-OFF FROM THE FORWARD END
OF AIRCRAFT PROPULSIVE POWER UNITS
Filed Nov. 7, 1950    2 SHEETS—SHEET 2
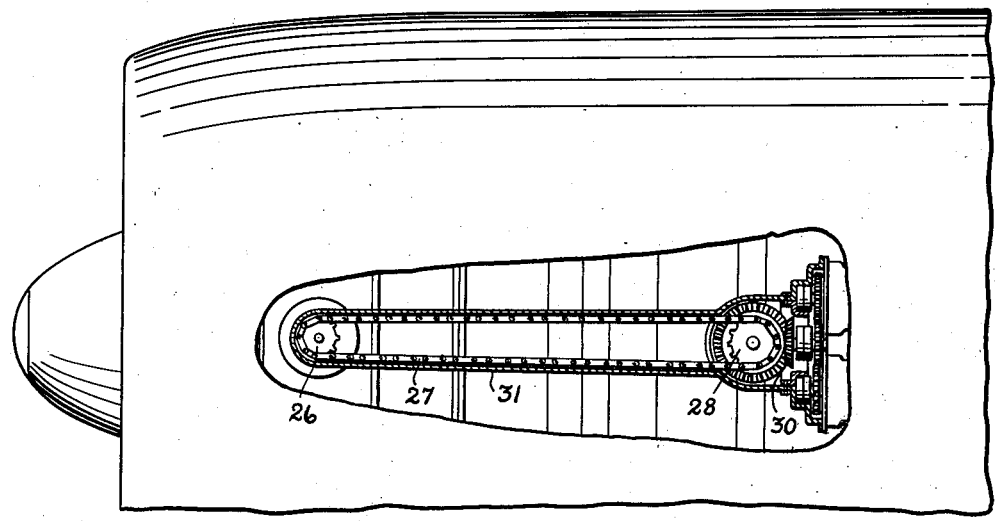
_FIG. 3._
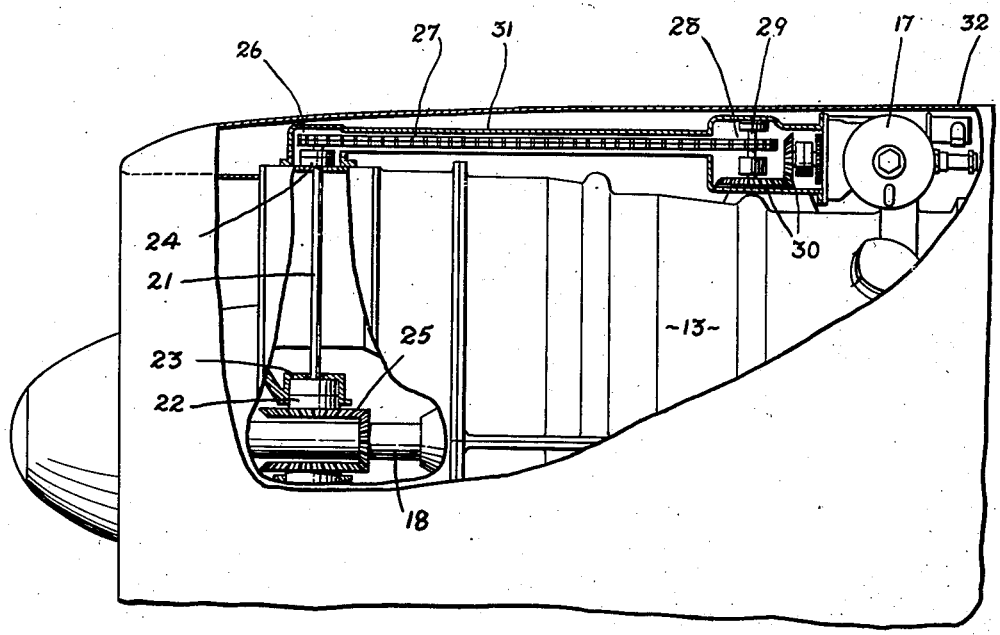
_FIG. 2._
INVENTORS
W. BOYD
L. C. SECORD
PER
ATTORNEY.

Patented Aug. 26, 1952

2,608,056

UNITED STATES PATENT OFFICE 2,608,056

POWER TAKE-OFF FROM THE FORWARD END OF AIRCRAFT PROPULSIVE POWER UNITS

Lloyd Calvin Secord, Toronto, Ontario, and Winnett Boyd, Bobcaygeon, Ontario, Canada, assignors to A. V. Roe Canada Limited, Malton, Ontario, Canada, a corporation Application November 7, 1950, Serial No. 194,407

6 Claims. (Cl. 60—39.33)

This invention relates to power take-off drives for auxiliaries of aircraft propulsive power units with particular reference to units having gas turbine engines with axial flow compressors the drives being located at the forward end of the engine.

It is common practice to install a power unit in the wing of an aircraft and it is of great importance that the frontal area of the nacelle or fairing, in which the unit is contained, should be as small as possible to reduce aerodynamic drag; in fact, regarding the power unit as a whole, it might be said that a decrease in frontal area is equivalent to an increase in the effective propulsive thrust. The nacelle is, of course, of streamlined form and its frontal area is determined by the installations contained therein; the maximum frontal area of the installations should therefore be disposed in the neighbourhood of the greatest depth of the aerofoil. For this reason it is customary to mount such engine-driven auxiliaries as the fuel pump and the auxiliary gear box, a slight distance behind the front end of the engine so that they can be accommodated advantageously at the point where the cross-sectional area of the nacelle is at its greatest and that of the bare engine is often at its least.

This arrangement of the auxiliaries sometimes presents difficulties in the location of the power take-off through which they are driven from the main engine shaft. Particularly in engines embodying axial flow compressors it is most convenient, in order to avoid mechanical complications, to locate the power take-off at the forward end of the compressor—that is, in the conventional arrangement, at the end of the compressor remote from the turbine whereby the compressor is driven. In such constructions, the take-off comprises a radially disposed shaft driven through bevel gearing from the main engine shaft, and transmitting power, again through bevel gearing, to a longitudinally disposed shaft, located externally of the engine and extending rearwardly to the auxiliaries aforementioned. Since it is not unusual for this power take-off to be required to transmit powers of the order of 100 H. P. it will be readily understood that the bevel gearing and the bearings supporting the radially and longitudinally disposed shafts must be fairly large. In consequence the bevel gearing assembly on the outside of the engine, at the forward end of the compressor, contributes a considerable proportion of the overall area of the power unit at this point, resulting in a nacelle of much greater frontal area than would be necessary if the size of the nacelle were determined by the frontal area of the compressor casing alone. This condition cannot be met satisfactorily by the provision of a special "helmet" or local excrescence in the nacelle, to accommodate the auxiliary drive, since such features are highly undesirable in aircraft operating at high subsonic speeds, for which gas turbine engines are customarily used.

It is therefore the principal object of this invention to provide a power take-off for driving the power unit auxiliaries, which will not materially increase the frontal area of the nacelle while retaining the mechanical convenience of the power take-off location at the front of the engine.

Other objects and advantages of the invention will be apparent from the following description of a preferred application thereof.

In the accompanying drawings forming a part of this specification and in which like reference characters designate like parts throughout the several views:

Figure 2 is a fragmentary broken away side elevation of an aircraft propulsive power unit showing details of the power take-off drive constructed according to the invention;

Figure 3 is a broken away plan of the construction shown in Figure 2; and

Figure 1:
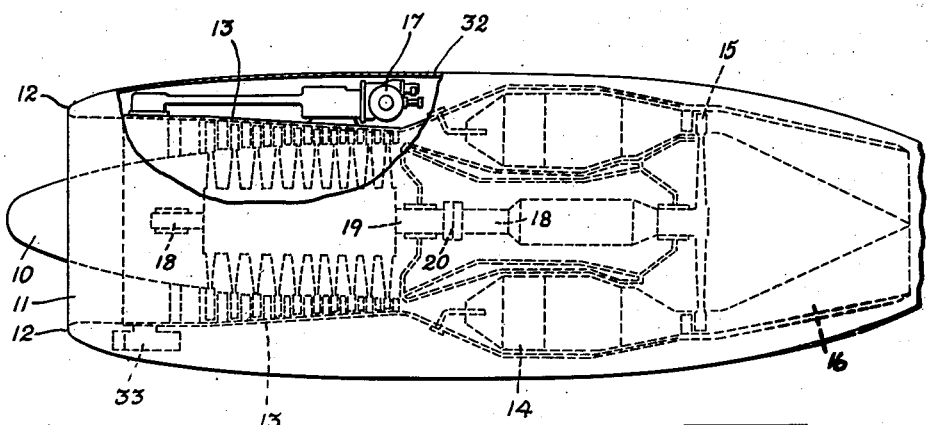
Figure 1 is a broken away side-elevation of an aircraft propulsive power unit showing a power take-off drive installation constructed according to the invention.
Figure 4:
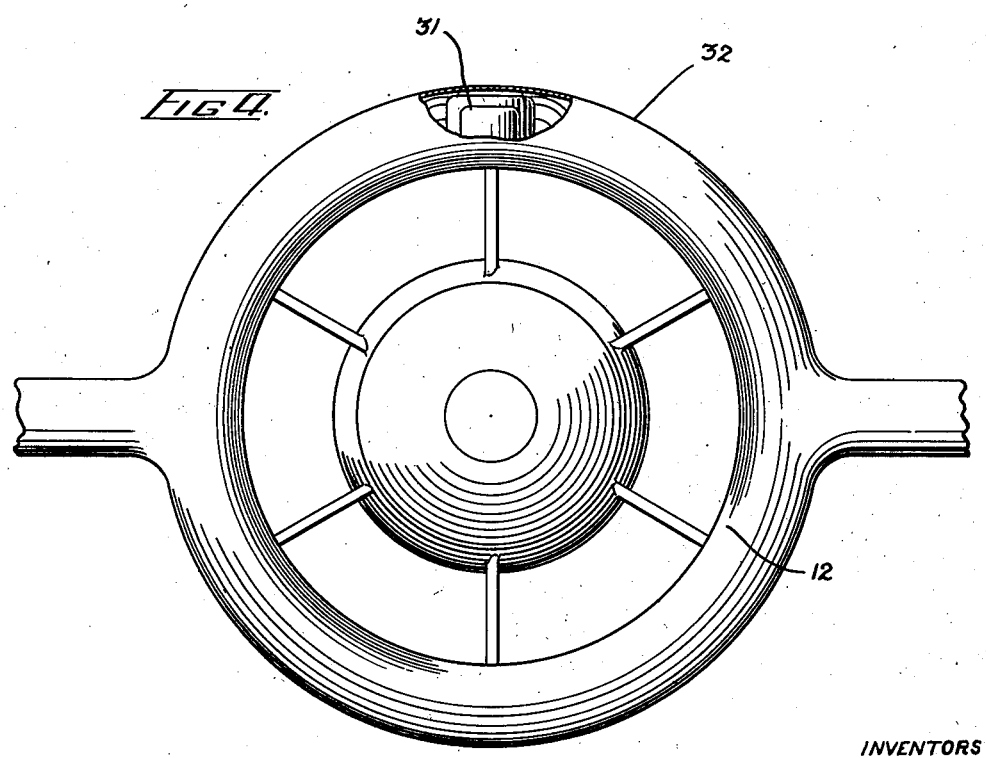
Figure 4 is a broken away front elevation of an aircraft propulsive power unit constructed according to the invention.

The direction of air flow is taken to be from left to right in Figures 1, 2 and 3 and the terms "forward," "rearward" and the like are used herein to denote upstream and downstream respectively. By reference to Figure 1 it will be seen that in a power unit an engine 10 is housed in a nacelle 11 which is a streamlined structure of substantially circular cross-section, extending rearwardly from the lip 12 of the engine intake. In accordance with normal practice the engine embodies an axial compressor 13, a combustion system comprising several combustion chambers 14 and a turbine 15 whereby the compressor is driven; the exhaust jet through a tail cone 16 produces a propulsive thrust on the unit. In the engine illustrated, which is typical of engines of this type, the overall diameter of the combustion system is greater than that of the compressor and there is therefore an annular depression in the contour of the engine at the point of juncture between these two components; in this depression auxiliaries 17 such as the fuel pump, the auxiliary gear box and the like, are normally mounted. As suggested hereinbefore, it is mechanically inconvenient to locate a power take-off drive to the auxiliaries directly from main shaft 18 aft of the compressor 13, since it would interfere with main centre bearing 19 and flexible coupling components 20 normally provided in this region. It is therefore normal practice to provide the power take-off at the forward end of the compressor as better illustrated in Figs. 2 and 3.

In accordance with this invention a power take-off shaft 21 for the auxiliaries is located at the forward end of the compressor and extends in a generally radial direction, supported by an inner bearing 22 in a housing 23 and an outer bearing 24 in the intake casting of the compressor casing. The power take-off shaft is coupled to the forward end of the engine by bevel gearing 25 and driven by the main shaft 18 which is coupled to the turbine 15.

The shaft 21 emerges through the compressor casing, and a sprocket 26 is keyed thereto immediately outboard of the bearing 24; the sprocket 26 is connected by a chain 27, as particularly shown in Figs. 2 and 3, to another sprocket 28 mounted on a short vertical shaft 29 through which power is transmitted to bevel gearing 30 of the auxiliaries 17. The chain assembly and the gearing 30 is contained in a gear casing 31 and every effort is made to restrict the height of the said casing; the outer skin 32 of the nacelle 11 is made to clear the casing 31, particularly at its forward end in the neighbourhood of the sprocket 26, with the minimum clearance necessary to avoid accidental contact or fretting during operation. Incidentally, the resulting space between the nacelle and the engine is quite sufficient to accommodate the comparatively small oil pump 33 mounted on the lower part of the engine as shown in Figure 1.

In operation, the compressor is driven by the turbine with which it is in series, and the drive is transmitted through the compressor to the bevel gearing 25 and thence to the radial power take-off shaft 21. The sprocket 26, keyed to the said shaft, transmits the power through the chain 27 to the sprocket 28, which in turn drives the auxiliaries 17 through the bevel gearing 30. The casing 31 serves to protect the chain drive and contain the necessary lubricant. By virtue of the very "flat" arrangement of a drive of this type the nacelle may be of thin streamlined section, thereby minimizing the inevitable aerodynamic drag and so enhancing the effective thrust of the power unit as a whole.

It will be realized that the size of the bearings and bevel gearing formerly required at the upper end of the power take-off shaft was comparable to the size of the bearing 22 and the bevel gearing 25; it was therefore extremely bulky for external installation and had a controlling influence upon the size of the nacelle. By the adoption of a chain drive in place of the bevel gearing, the frontal area of a typical installation may be reduced by the order of 10%. Those skilled in the art will appreciate the aerodynamic improvement effected by the invention, and the benefit thereby conferred upon the performance of the propulsive power unit.

Although the invention has been described in relation to a power unit having a gas turbine engine it is of course equally applicable to any type of aircraft power unit, of elongated form, having auxiliaries mounted on the engine, the auxiliaries being driven, for mechanical convenience, by a drive located near the front of the surrounding nacelle or fairing. It is to be understood therefore that the form of the invention herewith shown and described is to be taken as a preferred example of the same and that various changes in the detailed arrangement and in the size and shape of the parts may be resorted to without departing from the spirit of the invention or the scope of the subjoined claims.

What we claim as our invention is:

1. In an aircraft propulsive power unit of generally elongated form, a combustion engine, a power take-off comprising a shaft having one end coupled to the forward end of the engine and driven thereby and its other end extending externally of the engine, a sprocket mounted on the said other end of the shaft, auxiliaries mounted externally on the engine and spaced aft of the sprocket, a chain extending longitudinally of the engine and connecting the sprocket and the auxiliaries to transmit power from the shaft to the auxiliaries, and a streamlined fairing enveloping the engine, auxiliaries and power take-off.

2. In an aircraft propulsive power unit, a gas turbine engine having a generally cylindrical compressor at the forward portion of the unit in series with driving means for the compressor located aft of the compressor, a power take-off comprising a shaft having one end coupled to the forward end of the compressor and driven through the compressor and its other end extending externally of the engine, a sprocket mounted on the said other end of the shaft, auxiliaries mounted externally on the compressor and spaced aft of the sprocket, a chain extending longitudinally of the engine and connecting the sprocket and the auxiliaries to transmit power from the shaft to the auxiliaries, and a streamlined fairing enveloping the engine, auxiliaries and power take-off.

3. In an aircraft propulsive power unit, a gas turbine engine having a generally cylindrical axial flow compressor at the forward portion of the unit in series with a turbine to drive the compressor, the turbine being located aft of the compressor, engine-driven auxiliaries mounted externally on the compressor near its rearward end, and a power take-off for the auxiliaries comprising a shaft having one end coupled to the forward end of the compressor and driven through the compressor and its other end extending externally of the compressor, a sprocket mounted on the said other end of the shaft, a chain extending longitudinally of the engine from the sprocket to the auxiliaries to transmit power from the shaft to the auxiliaries, and a streamlined fairing enveloping the engine, auxiliaries and power take-off.

4. In an aircraft propulsive power unit, a gas turbine engine having a generally cylindrical axial flow compressor at the forward portion of the unit in series with a turbine to drive the compressor, the turbine being located aft of the compressor, engine driven auxiliaries mounted externally on the compressor near its rearward end, a power take-off for the auxiliaries comprising a shaft having one end coupled to the forward end of the compressor and driven through the compressor and its other end extending externally of the compressor, a sprocket mounted on the said other end of the shaft, a chain extending longitudinally of the engine from the sprocket to the auxiliaries to transmit power from the shaft to the auxiliaries, and a streamlined fairing within which the engine, auxiliaries and power take-off are installed in spaced relationship thereto, the space between the fairing and the compressor increasing progressively rearwardly so that the auxiliaries are located in a greater space and the sprocket in a lesser space, the frontal area of the fairing being the minimum compatible with adequate working clearances between the fairing and the power takeoff.

5. In an aircraft propulsive power unit, a gas turbine engine having a generally cylindrical axial flow compressor at the forward portion of the unit in series with a turbine to drive the compressor, the turbine being located aft of the compressor, engine-driven auxiliaries mounted externally on the compressor near its rearward end, a power take-off for the auxiliaries comprising a radially disposed shaft having one end coupled to the forward end of the compressor and driven through the compressor and its other end extending externally of the compressor, a sprocket mounted on the said other end of the shaft, a chain connecting the sprocket and the auxiliaries to transmit power from the shaft to the auxiliaries, and a streamlined fairing of substantially circular cross-section within which the engine, auxiliaries and power take-off are installed in spaced relationship thereto, the space between the fairing and the compressor increasing progressively rearwardly so that the auxiliaries are located in a greater space and the sprocket in a lesser space, the frontal area of the fairing being the minimum compatible with adequate working clearances between the fairing and the power take-off 6. In an aircraft propulsive power unit of generally elongated form, an axial flow gas turbine engine, a power takeoff comprising a shaft extending transversely of the engine and having one end coupled to the forward end of the engine and driven thereby and its other end extending externally of the engine, a sprocket mounted on the said other end of the shaft, auxiliaries mounted externally on the engine and spaced aft of the sprocket, a chain extending longitudinally of the engine and connecting the sprocket and the auxiliaries to transmit power from the shaft to the auxiliaries, and a streamlined fairing enveloping the engine, auxiliaries and power take-off.

LLOYD CALVIN SECORD.
WINNETT BOYD.

REFERENCES CITED

The following references are of record in the file of this patent:

UNITED STATES PATENTS

| Number | Name | Date |
|---|---|---|
| 1,241,623 | Gusey | Oct. 2, 1917 |
| 1,971,033 | De la Cierva | Aug. 21, 1934 |
| 2,424,839 | Morton | July 29, 1947 |
| 2,459,935 | Halford | Jan 25, 1949 |
| 2,531,761 | Zucrow | Nov. 28, 1950 |
| 2,542,628 | Christopher | Feb. 20, 1951 |